United States Patent
Hagiwara et al.

(10) Patent No.: US 10,726,983 B2
(45) Date of Patent: Jul. 28, 2020

(54) RARE EARTH MAGNET AND MOTOR

(71) Applicant: TDK Corporation, Tokyo (JP)

(72) Inventors: Jun Hagiwara, Tokyo (JP); Fumitaka Baba, Tokyo (JP); Makoto Iwasaki, Tokyo (JP); Satoshi Koga, Tokyo (JP)

(73) Assignee: TDK CORPORATION, Minato-Ku, Tokyo (JP)

( * ) Notice: Subject to any disclaimer, the term of this patent is extended or adjusted under 35 U.S.C. 154(b) by 117 days.

(21) Appl. No.: 15/439,975

(22) Filed: Feb. 23, 2017

(65) Prior Publication Data
US 2017/0278609 A1    Sep. 28, 2017

(30) Foreign Application Priority Data
Mar. 23, 2016    (JP) .................... 2016-059075

(51) Int. Cl.
*H02K 1/00* (2006.01)
*H01F 7/02* (2006.01)
*H02K 1/04* (2006.01)

(52) U.S. Cl.
CPC .............. *H01F 7/021* (2013.01); *H02K 1/04* (2013.01)

(58) Field of Classification Search
CPC .. H01F 7/02; F04B 17/03; H02K 5/04; H02K 5/08
USPC ........................................................ 310/43
See application file for complete search history.

(56) References Cited

U.S. PATENT DOCUMENTS

| | | | | |
|---|---|---|---|---|
| 5,500,994 A | * | 3/1996 | Itaya | H02K 1/2733 264/272.2 |
| 8,222,785 B2 | * | 7/2012 | Komuro | B82Y 10/00 148/302 |
| 2006/0022175 A1 | * | 2/2006 | Komuro | H01F 1/0572 252/500 |
| 2006/0292395 A1 | * | 12/2006 | Mori | C22C 38/005 428/692.1 |
| 2016/0273091 A1 | * | 9/2016 | Sagawa | B22F 1/0059 |
| 2016/0297028 A1 | | 10/2016 | Sagawa et al. | |

FOREIGN PATENT DOCUMENTS

| | | | |
|---|---|---|---|
| JP | 2005-198365 A | 7/2005 | |
| JP | 2006-303197 A | 11/2006 | |
| JP | 2007-207936 A | 8/2007 | |
| JP | 2007329331 A * | 12/2007 | .......... H01F 1/0577 |
| WO | WO 2014/148355 A1 | 9/2014 | |
| WO | WO 2014/148356 A1 | 9/2014 | |

OTHER PUBLICATIONS

JP-2007329331-A machine translation Oct. 24, 2019.*

* cited by examiner

*Primary Examiner* — Alfonso Perez Borroto
*Assistant Examiner* — Leda T Pham
(74) *Attorney, Agent, or Firm* — Faegre Drinker Biddle & Reath LLP

(57) ABSTRACT

A rare earth magnet capable of reducing an eddy current loss by virtue of a low-cost, simple configuration, when mounted in a motor, is to be provided. The rare earth magnet can include a magnet body that includes a rare earth element and iron; and a resistive layer formed on at least one surface of the magnet body, the resistive layer comprising a rare earth element, iron, and oxygen and having an average volume resistivity of $10^3$ Ωcm or more and a thickness of from 3 to 25 μm.

5 Claims, 6 Drawing Sheets

RARE EARTH MAGNET AND MOTOR

TECHNICAL FIELD

The present invention relates to a rare earth magnet as well as to a motor.

BACKGROUND

In recent years, as motors became high-performance ones, there has been the development of a large number of motors with the installation of the so-called rare earth magnets [R—Fe—B based magnets wherein R represents a rare earth element such as neodymium (Nd): The same hereinafter].

Here, since the rare earth magnet is a metal magnet, it is different from a ferrite magnet comprised of an oxide, and thus, the electrical resistance of a magnet body is low. For this reason, when rare earth magnets are mounted in a motor, there is a problem that the loss resulting from an eddy current to be generated on the surfaces of the rare earth magnets during their use increases and the motor efficiency falls. In an attempt to reduce such an eddy current loss, there has been proposed a method for reducing the eddy current loss, which comprises dividing a rare earth magnet, covering the divided, individual rare earth magnets with resin coating, an adhesive, or the like, and thereby, insulating between the rare earth magnets (Patent Literature 1).

CITATION LIST

Patent Literature

Patent Literature 1: Japanese Unexamined Patent Publication No. 2005-198365

SUMMARY

However, according to the method in the prior art, the divided, individual rare earth magnets are covered with resin coating, an adhesive, or the like; therefore, the process is complicated and the production cost is high.

The present invention has been made in view of the problem of the aforementioned technology in the prior art, and it is an object of the present invention is to provide a rare earth magnet capable of reducing an eddy current loss by virtue of a low cost- and simple configuration, as well as to provide a motor comprising the rare earth magnet.

The rare earth magnet of the present invention comprises: a magnet body comprising a rare earth element and iron; and a resistive layer formed on at least one surface of the magnet body, wherein the resistive layer comprises a rare earth element, iron, and oxygen, and has an average volume resistivity of $10^3$ Ωcm or more and a thickness of from 3 to 25 μm.

It is preferred that the magnet body comprises Nd, Pr, Dy, or Tb.

It is preferred that the rare earth magnet comprises a heavy rare earth element(s) and has a region where a concentration of at least one heavy rare earth element decreases from at least one surface of the rare earth magnet toward an inside thereof.

It is preferred that the resistive layer comprises:
a first layer covering the magnet body and comprising at least, a rare earth element, iron, and oxygen;
a second layer covering the first layer and comprising at least, a rare earth element, iron, and oxygen; and
a third layer covering the second layer and comprising at least, iron and oxygen,
wherein the second layer has a less content of iron than each of the first and the third layers and has a structure such that 2-A layer and 2-B layer are alternately laminated, the 2-B layer having a more content of iron and a less content of R than the 2-A layer.

The motor of the present invention may comprise a plurality of the rare earth magnets, wherein each of the rare earth magnets is in contact with an adjoining rare earth magnet through the resistive layer.

The motor of the present invention may be such that the rare earth magnet is in contact with a rotor core through the resistive layer.

According to the present invention, it is possible to provide a rare earth magnet capable of reducing an eddy current loss by virtue of a low cost- and simple configuration, as well as to provide a motor comprising the rare earth magnet.

DETAILED DESCRIPTION

Figure 1:
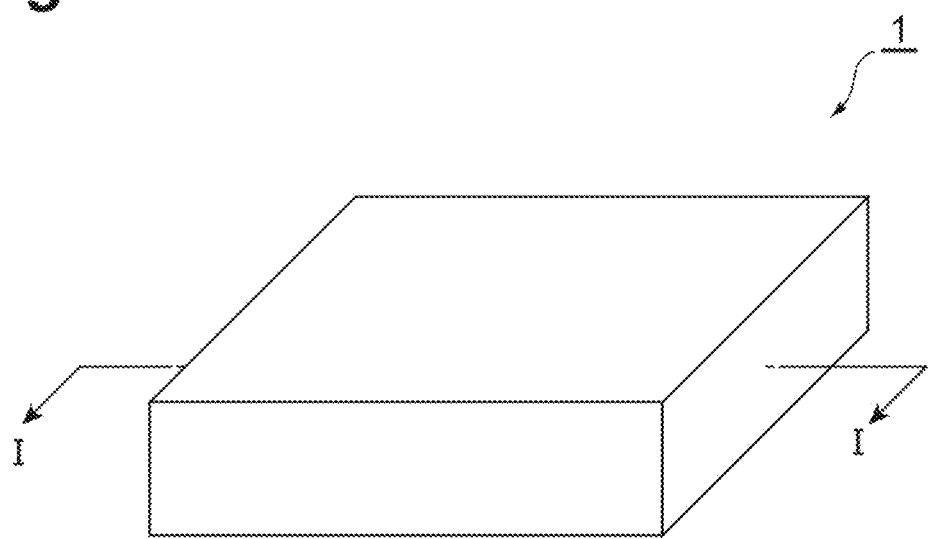
FIG. 1 is a schematic perspective view showing an embodiment of a rare earth magnet of the present invention.

Hereinafter, the preferred embodiments of the present invention will be described in detail while referring to the drawings as necessary. Note that in the drawings the same reference numeral is designated to the same component and duplicated explanations will be omitted. In addition, the positional relations of top and bottom, left and right are to be based on the positional relations illustrated in the drawings unless otherwise indicated. Further, the dimensional ratios in the drawings are not limited to those of their illustrations.

Figure 2:
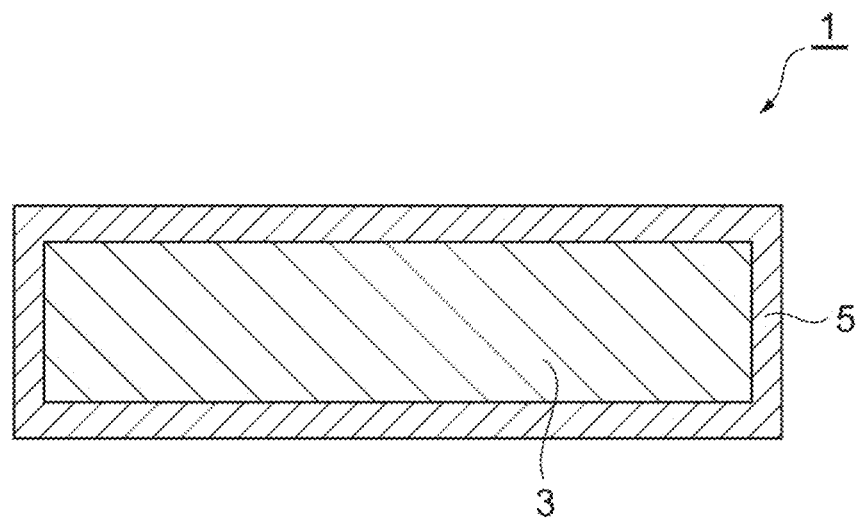
FIG. 2 is a schematic cross-sectional view showing an embodiment of the rare earth magnet of the present invention.

FIG. 1 is a schematic perspective view showing an embodiment of a rare earth magnet of the present invention. FIG. 2 is a view schematically representing a cross section that appears when the rare earth magnet of FIG. 1 is cut along the I-I line. As FIGS. 1 and 2 show, a rare earth magnet 1 of the present embodiment comprises a magnet body 3 and a resistive layer 5 formed on the surface of this magnet body 3. Also, the resistive layer 5 may be formed on at least one surface of the magnet body 3 but may be :formed on the entire surface of the magnet body 3. When the resistive layer 5 is formed on the entire surface of the magnet body 3, insulation can be made not only between the rare earth magnets but also between the rare earth magnet and a conductor such as a casing that accommodates the rare earth magnets within a magnet housing of a motor, which is thus preferable.

(Magnet Body)

Magnet body 3 is a permanent magnet comprising a rare earth element(s) and iron. In this case, the rare earth element refers to scandium (Sc), yttrium (Y), and a lanthanoid element, each of which belongs to Group III of the long-periodic table. Further, the lanthanoid elements include, for example, lantern (La), cerium (Ce), praseodyum (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), and the like.

As a constituent material of the magnet body 3, there can be illustrated a combination of the rare earth element and iron, and a transition element other than the rare earth elements and the iron to be included. In this case, the rare earth element is preferably at least one element selected from the group consisting of Nd, Sm, Dy, Pr, Ho, and Tb. It is more preferable to further include at least one element selected from the group consisting of La, Ce, Gd, Er, Eu, Tm, Yb, and Y in addition to these elements.

Also, the transition element other than the rare earth elements is preferably at least one element selected from the group consisting of cobalt (Co), titanium (Ti), vanadium (V), chromium (Cr), manganese (Mn), nickel (Ni), copper (Cu), zirconium (Zr), niobium (Nb), molybdenum (Mo), hafnium (Hf), tantalum (Ta), and tungsten (W); and it is more preferably Co.

More specifically, one of an R—Fe—B type and an R—Co type can be illustrated as the constituent material of the magnet body 3. In the former constituent material, rare earth elements based on Nd as the principal component are preferable for R; and in the latter constituent material, rare earth elements based on Sm as the principal component are preferable for R.

The constituent material of the R—Fe—B type is particularly preferable as the constituent material of magnet body 3. Such material substantially has a main phase of a crystal structure of the tetragonal system; and it has a rare earth-rich phase that contains a higher inclusion proportion of the rare earth element(s) and a boron-rich phase that contains a higher inclusion proportion of boron as a grain boundary portion of the main phase. These rare earth-rich phase and boron-rich phase are non-magnetic phases having no magnetism. Such non-magnetic phase is normally included at from 0.5 to 50 volume % in the constituent material of the magnet. In addition, the particle size of the main phase is normally on the order of from 1 to 100 µm.

In the constituent material of such R—Fe—B type, it is preferred that the content of a rare earth element(s) is from 8 to 40 atom %. If the content of a rare earth element(s) is less than 8 atom %, the crystal structure of the main phase will be almost the same as that of a iron and the coercive force (iHc) will tend to be small. On the other hand, if it exceeds 40 atom %, the rare earth-rich phase will be formed excessively and the residual magnetic flux density (Br) will tend to be small.

It is also preferred that the content of Fe is from 42 to 90 atom %. If the content of Fe is less than 42 atom %, the residual magnetic flux density will be small. Further, if it exceeds 90 atom %, the coercive force will tend to be small. Still further, it is preferred that the content of B is from 2 to 28 atom %. If the content of B is less than 2 atom %, a rhombohedral structure is likely formed, thereby leading to a tendency of small coercive force. If it exceeds 28 atom %, the born-rich phase is formed excessively, thereby leading to a tendency of small residual magnetic flux density.

In the aforementioned constituent material, one part of Fe in the R—Fe—B type may be substituted with Co. When the one part of Fe has thus been substituted with Co, temperature characteristics can be improved without lowering magnetic properties. In this case, it is desirable that the amount of Co substitution is at the level that will not be greater than the content of Fe. If the content of Co exceeds the content of Fe, the magnetic properties of the magnet body 3 tend to be small.

Further, one part of B in the aforementioned constituent material may be substituted with an element such as carbon (C), phosphorous (P), sulfur (S), or copper (Cu). When the one part of B has thus been substituted, the production of the magnet body will become easy, and besides, a reduction in the production cost will possibly be planned. Then, it is desired that the amount of substitution by these elements is set to be an amount which does not substantially influence the magnetic properties. It is preferably set to be 4 atom % or less relative to the total mass of the constituent atoms.

Furthermore, from the standpoint of planning the improvement of coercive force or the reduction in the production cost, there may be added to the aforementioned constituents, elements such as aluminum (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (Ge), tin (Sn), zirconium (Zr), nickel (Ni), silicon (Si), gallium (Ga), copper (Cu), and hafnium (Hf). It is also preferable to set the amounts of these additions in the range that does not influence the magnetic properties. It is preferably set to be 10 atom % or less relative to the total mass of the constituent atoms. In addition, as components to be mixed in unavoidably, oxygen (O), nitrogen (N), carbon (C), calcium (Ca), and others are assumed. These may be contained at an amount of about 3 atom % or less relative to the total mass of the constituent atoms.

The magnet body 3 having such a configuration can be produced by a powder metallurgic method. At first, in this method, an alloy having a desired composition is produced by a well-known alloy production process such as a casting method or a strip cast method. Next, a coarse grinder such a jaw crusher, a brown mill, or a stamp mill is used to pulverize this alloy to a particle size of from 10 to 100 µm; then, it is further made to a particle size of from 0.5 to 5 µm by means of a fine grinder such as a jet mill or an Attiritor. The thus-obtained powder is preferably molded at a pressure of from 0.5 to 5 t/cm² (500 to 5,000 kg/cm²) in a magnetic field having a magnetic field strength of 600 kA/m or more.

Then, after the obtained molded body is preferably sintered at from 1,000 to 1,200° C. for 0.5 to 10 hours in an inert gas atmosphere or in vacuum, it is quenched. Furthermore, this sintered body is heat-treated at from 500 to 900° C. for one to 5 hours in an inert gas atmosphere or in vacuum; and the sintered body is processed into a desired shape (i.e., practical use shape), as necessary, to obtain the magnet body 3.

It is preferred that the thus-obtained magnet body 3 is further subjected to acid cleaning. Specifically, it is preferred that the acid cleaning is performed on the surface of the magnet body 3 at a stage prior to heat treatment which will be described later.

Nitric acid is preferable as the acid to be used in the acid cleaning. When a general steel material is subjected to plating, a non-oxidative acid such as hydrochloric acid or sulfuric acid is frequently used. However, if these acids are used to perform the treatment when a magnet body 3 contains a rare earth element as does the magnet body 3 according to the present embodiment, hydrogen generated by the acid is occluded in the surface of the magnet body 3 and the site of occlusion is embrittled; and a large amount of a powdery undissolved product forms. This undissolved product causes surface roughness, defects, or poor adhesion after the surface treatment; therefore, it is preferred that the aforementioned non-oxidative acid is not included in an acid cleaning treatment solution. Accordingly, it is preferable to use nitric acid, which is an oxidative acid, with little generation of hydrogen.

It is preferred that the amount of dissolution of the surface of the magnet body 3 by such acid cleaning is set to be 5 μm or more from the surface in terms of the average thickness, and preferably, from 10 to 15 μm. By completely removing an altered layer or oxidized layer that results from the surface processing of the magnet body 3, it is possible to form a desired resistive layer with more precision through heat treatment which will be described later.

The nitric acid concentration of a treatment solution for use in the acid cleaning is preferably one normal or less, and particularly preferably, 0.5 normals or less. If the nitric acid concentration is too high, the rate of dissolution of the magnet body 3 will be extremely fast and the control of the amount of dissolution will thus be difficult. Particularly, fluctuations become large in a mass treatment such as a barrel treatment, and the maintenance of the precision of dimensions of the product tends to be difficult. Further, if the nitric acid concentration is too low, the amount of dissolution tends to be insufficient. Therefore, the nitric acid concentration is preferably set to be one normal or less, and particularly preferably, to be from 0.5 to 0.05 normals. Furthermore, the amount of dissolution of Fe at the time the treatment ends is set to be on the order of from 1 to 10 g/L.

Cleaning with the use of ultrasonic waves is preferably performed on the magnet body 3 that has undergone the acid cleaning in order to completely remove a small amount of the undissolved product and residual acid components from its surface. This ultrasonic cleaning is preferably carried out in pure water where there is extremely little chlorine ion that generates rust on the surface of magnet body 3. In addition, a similar water cleaning may be done as necessary at each stage of before and after the ultrasonic cleaning and the acid cleaning.

(Diffusion Step)

The magnet body 3 of the present embodiment may be one obtainable by allowing a heavy rare earth element(s) to diffuse in a grain boundary. When the magnet body 3 is the one obtainable by allowing the heavy rare earth element(s) to diffuse in the grain boundary, the magnet body 3 has a region where the concentration of at least one heavy rare earth element decreases from at least one surface of the magnet body 3 toward the inside of magnet body 3. Here, the heavy rare earth element may be at least one selected from the group consisting of Gd, Tb, Dy, Ho, Er, Tm, Yb, and Lu. From the standpoint of improving the coercive force of a magnet body, it is preferred that the magnet body contains Dy or Tb. Such magnet body 3 is obtained by allowing the heavy rare earth element(s) to diffuse in a magnet body according to the diffusion step below.

(Diffusion Step)

At first, a heavy rare earth compound containing a heavy rare earth element(s) is allowed to adhere to the surface of the magnet body described above, the surface of which has been cleaned. The heavy rare earth compound includes an alloy, an oxide, a halide, a hydroxide, a hydride, and the like; and it is particularly preferable to use the hydride. When the hydride is used, only the heavy rare earth element contained in the hydride diffuses within the magnet body 3 at the diffusion step. Hydrogen contained in the hydride is released outside the magnet body 3 during the diffusion step. Therefore, if a hydride of the heavy rare earth element is used, it will be easy to prevent a reduction of the residual magnetic flux density of the magnet, because impurities originating from the heavy rare earth compound do not remain in the magnet body 3 to be obtained finally. The hydride of the heavy rare earth element includes $DyH_2$, $TbH_2$, or a hydride of Dy—Fe or Tb—Fe. Particularly, $DyH_2$ or $TbH_2$ is preferable. When the hydride of Dy—Fe is used, Fe also tends to diffuse in the magnet body 3 at a heat treatment step. When a fluoride or an oxide of the heavy rare earth element is used, fluorine or oxygen diffuses into the magnet body 3 during the heat treatment and remains in the magnet body 3, tending to deteriorate the magnetic properties. Therefore, the fluoride or oxide of the heavy rare earth element is not preferable as a heavy rare earth compound to be used in the present embodiment.

The heavy rare earth compound to be adhered to the magnet body 3 is preferably particulate. The average particle size is preferably from 100 nm to 50 μm, and more preferably from 1 to 10 μm. If the particle size of the heavy rare earth compound is less than 100 nm, there will be an excessive amount of the heavy rare earth compound that diffuses in the magnet body 3 at the diffusion step, and the residual magnetic flux density of the rare earth magnet will tend to be low. If the particle size exceeds 50 μm, the heavy rare earth compound will scarcely diffuse in the magnet body 3 and an improvement effect of the coercive force will not tend to be sufficiently obtained.

As a method of adhering the heavy rare earth compound to the magnet body 3, there are mentioned, for example, a method of spraying to the magnet body 3, the particles of the heavy rare earth element as such, a method of applying to the magnet body 3, a solution where the heavy rare earth compound has been dissolved in a solvent, a method of applying to the magnet body 3, a diffusing agent in slurry where the particles of the heavy rare earth compound are dispersed in a solvent, and a method of vapor-depositing the heavy rare earth element. Among them, the method of applying the diffusing agent to the magnet body 3 is preferable. When the diffusing agent is used, the heavy rare earth compound can be adhered to the magnet body 3 uniformly, and thus, the diffusion of the heavy rare earth element can be progressed securely. Hereinafter, the case where the diffusing agent is used will be described.

The solvent to be used as a diffusing agent is preferably one capable of dispersing the heavy rare earth compound without its dissolution. The examples include an alcohol, an aldehyde, and a ketone. Among them, ethanol is preferable. The magnet body 3 may be immersed in the diffusing agent, or the diffusing agent may be dropped on the magnet body 3.

When the diffusing agent is used, the content of the heavy rare earth compound in the diffusing agent may be appropriately adjusted depending on a desired value of the mass concentration of the heavy rare earth element relative to the rare earth magnet. For example, the content of the heavy rare earth compound in the diffusing agent may be from 10 to 50 mass % or from 40 to 50 mass %. If the content of the heavy rare earth compound in the diffusing agent is outside these numeral ranges, the heavy rare earth compound will unlikely adhere to the magnet body uniformly. Further, if the content of the heavy rare earth compound in the diffusing agent is too much, there may be cases where the heavy rare earth element which has not been able to diffuse remains on the surface of the magnet body 3, or the excessive diffusion of the heavy rare earth element causes the residual magnetic flux density of the magnet to be lowered.

Components other than the heavy rare earth compound may be further contained in the diffusing agent if necessary. For example, as the other components that may be contained in the diffusing agent, there are mentioned a dispersing agent for preventing the aggregation of the particles of the heavy rare earth compound and others.

Heat treatment is performed on the magnet body 3 with the heavy rare earth compound adhered thereto; thereby, the heavy rare earth compound adhered to the surface of the magnet body 3 diffuses within the magnet body 3. The rare earth compound diffuses along the grain boundary within the magnet body. The mass concentration of the heavy rare earth element in the grain boundary is higher than that in the grain of the main phase contained in the magnet body 3. The heavy rare earth element thermally diffuses from a region where the mass concentration is high to a region where the mass concentration is low. Therefore, the heavy rare earth element that has diffused in the grain boundary then diffuses within the grain of the main phase thermally.

The heat-treatment temperature at the diffusion step may be from 700 to 950° C. It is preferred that the heat-treatment time at the diffusion step is from 5 to 50 hours.

The magnet body 3 may be subjected to an aging treatment after an molded body is sintered, or after the diffusion step. The aging treatment contributes to the improvement of the magnetic properties of a sintered magnet (particularly, coercive force). The aging treatment may be carried out at a treatment temperature of from 450 to 600° C. and for a treatment time of from 0.5 to 5 hours.

The surface of the magnet body 3 may be cleaned with nitric acid, nitric acid/ethanol, or the like before the formation of a resistive layer which will be described later. With respect to the surface state of the magnet body 3 after cleaning, it is preferred that the arithmetic average roughness Ra of the surface of the magnet body 3 is greater than 2 μm. Also, the maximum height Ry of the magnet body 3 is preferably greater than 15 μm. If the arithmetic average roughness Ra and the maximum height Ry of the surface of the magnet body 3 are in the aforementioned range, a resistive layer having a desired thickness can easily be obtained.

(Resistive Layer)

The resistive layer 5 comprises a rare earth element, iron, and oxygen and it has an average volume resistivity of $10^3$ Ωcm or more and a thickness of from 3 to 25 μm. The rare earth element contained in the resistive layer 5 may be that originated from the magnet body 3. In addition, the resistive layer 5 may contain an element originated from the magnet body 3 in addition to the rare earth element. Here, the elements originated from the magnet body 3 are constituent materials of the magnet body 3 and include at least, a rare earth element and a transition element other than the rare earth element; there are cases where B, Ga, Co, Cu, Zr, Bi, Si, Al, or the like is further contained. The resistive layer 5 can be formed by subjecting the surface of the magnet body 3 to oxidation treatment, which will be described later. In addition, the resistive layer 5 is a layer containing 1 mass % or more of oxygen atom in the main phase grain of $Nd_2Fe_{14}B$ and is distinguished from the magnet body that does not contain oxygen substantially (i.e., less than 1 mass % and normally less than 0.5 mass %) in its constitution. Note that the content of each constituent element of the resistive layer 5 and the magnet body 3 can be confirmed using a composition analysis method that is known in the art, such as WDS (wavelength dispersive X-ray spectrometry), EPMA (electron beam Probe microanalyzer method), XPS (X-ray photoelectron spectroscopy), AES (Auger electron spectroscopy), or EDS (energy dispersive X-ray spectroscopy).

The resistive layer 5 has an average volume resistivity of $10^3$ Ωcm or more. If the average volume resistivity of the resistive layer 5 is less than $10^3$ Ωcm, the insulation obtainable when the rare earth magnets are contacted with each other through the resistive layer is poor, and there is a tendency to be unable to reduce an eddy current loss sufficiently. Further, the upper limit of the average volume resistivity is not particularly limited. However, if it is less than $10^5$ Ωcm, it can prevent the resistive layer 5 from being overly oxidized and being fragile to be easily cracked, while it tends to be able to prevent the resistive layer 5 from being easily peeled from the magnet body 3 by virtue of a larger difference in composition between the resistive layer 5 and the magnet body 3. In addition, because the magnet body 3 is a good conductor, its volume resistivity is much lower than that of the resistive layer and is on the order of from $10^{-4}$ to $10^{-3}$ Ωcm.

The volume resistivity of the resistive layer 5 may increase from the boundary at the side of the magnet body 3 of the resistive layer 5 toward the surface that is opposite to the magnet body 3. When the volume resistivity is not constant in the direction of the thickness of the resistive layer 5, the average volume resistivity of the resistive layer 5 is assumed to be an average value of the whole of the resistive layer 5. In addition, the average volume resistivity of the resistive layer 5 can be measured by the method of the Example.

The thickness of the resistive layer 5 is from 3 to 25 μm and is preferably from 4 to 20 μm. The thickness of the resistive layer 5 may also be from 6 to 25 μm or from 7 to 25 μm. If the thickness of the resistive layer 5 is less than 3 μm, the reduction in the eddy current loss tends to be no longer sufficient. If the thickness of the resistive layer 5 is greater than 25 μm, the reduction in the eddy current loss tends to be no longer sufficient, because cracks and partial exfoliations occur in the resistive layer and the leak causes the electrical resistance value to be substantially lowered.

The resistive layer 5 can be formed by oxidizing the surface of magnet body 3 in an oxidizing atmosphere containing an oxidizing gas. The thickness and average volume resistivity of the resistive layer 5 can be controlled by adjusting at least one condition of the partial pressure of oxidizing gas, type of oxdizing gas, treatment temperature, and treatment time. In addition, in the case of such heat treatment, it is preferable to adjust the three conditions of the partial pressure of the oxidizing gas, the treatment temperature, and the treatment time.

Here, the oxidizing atmosphere is not particularly limited as long as it is an atmosphere containing the oxidizing gas. However, it is an atmosphere under which oxidation is promoted, including air, an oxygen atmosphere (preferably, a oxygen partial pressure adjusted atmosphere), and a steam atmosphere (preferably, a steam partial pressure adjusted atmosphere). Further, the oxidizing gas is not particularly limited, but oxygen, steam, and the like are mentioned. For example, the oxygen atmosphere is an atmosphere having an oxygen concentration of 0.1% or more, and in the atmosphere, an inert gas coexists together with oxygen. Nitrogen is mentioned as such inert gas. Specifically, the form of the oxygen atmosphere may be an atmosphere consisting of oxygen and the inert gas. In addition, the steam atmosphere is an atmosphere having a steam partial pressure of 10 hPa or more, and in the atmosphere, an inert gas coexists together with steam. Nitrogen is mentioned as such inert gas, and the form of the steam atmosphere may be an atmosphere consisting of steam and the inert gas. If the oxidizing atmosphere employs the steam atmosphere, it is preferable because the resistive layer can be formed easily. Furthermore, an atmosphere containing oxygen, steam, and an inert gas is also mentioned as the oxidizing atmosphere.

The treatment temperature is preferably adjusted from a range of from 200 to 550° C. and is more preferably adjusted from a range of from 250 to 500° C. If the treatment temperature is in the range of from 200 to 550° C., a resistive layer having the aforementioned thickness and average volume resistivity is easily formed.

Moreover, the treatment time is preferably adjusted from a range of from one minute to 24 hours and is more preferably adjusted from a range of from 5 minutes to 10 hours. If the treatment time is in a range of from 5 minutes to one hour, a resistive layer having the aforementioned thickness and average volume resistivity is easily formed.

In this case, the treatment time and the treatment temperature are preferably adjusted from the aforementioned ranges. Further, the partial pressure of steam is preferably adjusted from a range of from 10 to 2,000 hPa. If the partial pressure of steam is less than 10 hPa, the resistive layer tends to hardly become a structure with plural layers which will be described later. On the other hand, if it exceeds 2,000 hPa, the high pressure makes the device configuration complicated, and besides, dew condensation is easy to form, which tends to deteriorate the workability. Moreover, it is preferred that treatment conditions are adjusted by a method of introducing the atmospheric gas. For example, it is effective to introduce superheated steam obtainable by heating steam at 100° C. or more. If the superheated steam is used, heat can be conveyed to the magnet body 3 more effectively than can a normal gaseous species. Nevertheless, since the oxidizability of the superheated steam itself is low, it is more preferable to combine the superheated steam with an oxidizing gas such as oxygen and to introduce them as adjusted. It is also effective to heat the magnet body 3 in the inert gas and to introduce the oxidizing atmosphere at the stage where a desired temperature is reached. These can prevent the magnetic properties from being reduced as a result of the magnet body 3 having been exposed to the oxidizing atmosphere more than necessary; thus, a desirable resistive layer 5 can be formed on the surface of the magnet body 3.

When the resistive layer 5 was formed by the aforementioned oxidation treatment, an oxide film on the surface of the magnet body corresponds to the resistive layer 5. This oxide film may be composed of plural layers of oxide films. For example, the oxide film may be a three-layer structure having a first layer that covers the magnet body 3 and comprises at least, a rare earth element, iron, and oxygen, a second layer that covers the first layer, comprises at least, a rare earth element, iron, and oxygen and has a less content of iron than the first layer, and a third layer that covers the second layer and comprises at least, iron and oxygen. The first layer has a thickness of preferably from 2.9 to 25 µm (provided that it is less than 25 µm), and of more preferably from 3.9 to 24 µm. The second layer has a thickness of preferably from 1 to 500 nm, and of more preferably from 10 to 350 nm. The third layer has a thickness of preferably from 5 to 1,000 nm, and of more preferably from 50 to 500 nm. It is preferred that the second layer has a less content of iron than each of the first layer and the third layer. The third layer is preferably crystalline. In an effort to reduce an eddy current heat generation loss at the time a magnet was incorporated into a motor, the conditions of the oxidation treatment and the production processes were altered, whereby there was found a resistive layer 5 having a film thickness range and a film structure which displayed an appropriate average volume resistivity. One example is that the third layer is of a porous structure; the other example is that the second layer becomes a mille-feuille structure (a multilayer structure with thin layers). While the entire second layer is $RFeO_x$ (a rare earth metal-iron-oxide) with less Fe than each of the first and third layers, the second layer may have two types of layers, 2-A layer and 2-B layer, as well as may have a structure such that the 2-A layer and the 2-B layer having a more content of iron but a less content of R than the 2-A layer are laminated alternately. By letting the resistive layer have the first to the third layers as described above, it will be possible to reduce stress among the respective films and to suppress cracks and partial exfoliations, while maintaining preferable electrical resistance, when the resistive layer (i.e., the total of the oxide layers) is comparatively thick (3-25 µm).

The resistive layer 5 is not limited by way of the production process through the oxidation treatment. For example, the formation by chemical conversion treatment is possible. Normally, the chemical conversion treatment bath contains phosphoric acid, nitric acid, zircon acid, tungstic acid, silicic acid, etc. as lysates of their salts such as ions or colloids. Immersion of the magnet body in the bath allows the surface of the magnet body to elute, which raises the local pH in the vicinity of the magnet surface, and thereby, forms an oxide coating on the magnet surface. The oxide film contains the salts originating from the chemical conversion bath as well as contains iron and a rare earth element originating from the base of the magnet.

As above, the rare earth magnet 1 and its production process according to the preferred embodiments have been described. However, the rare earth magnet of the present invention and its production process are not limited to the embodiments described above and may be altered as appropriate within which the gist is not departed therefrom.

(Motor)

Figure 3:
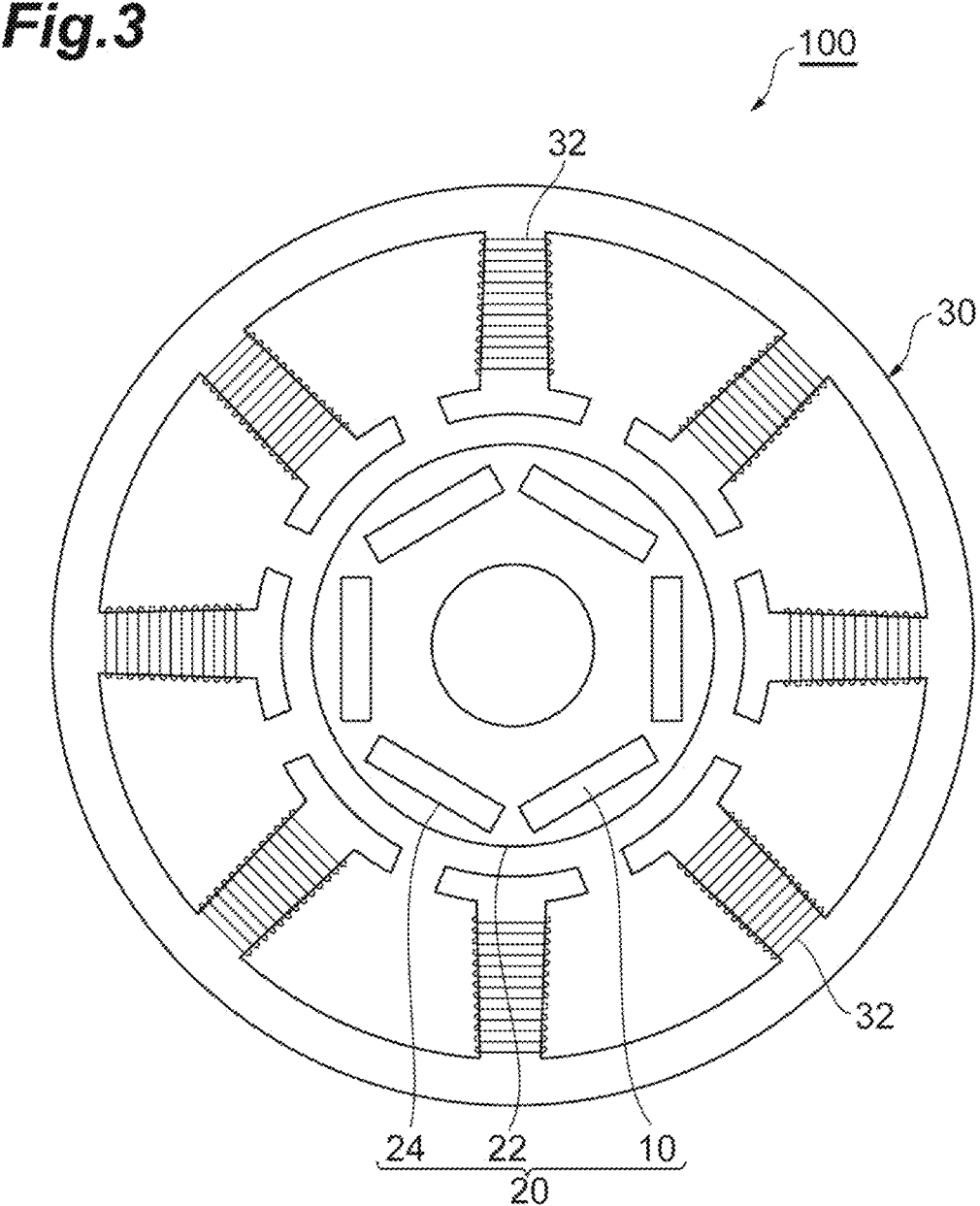
FIG. 3 is a view showing an inner structure of a motor according to one embodiment of the present invention.

FIG. 3 is an illustration showing an example of the inner structure of a motor of the present embodiment. Motor 100 of the present embodiment is a permanent magnet synchronous motor (an IPM motor) and comprises a cylindrical rotor 20 and a stator 30 disposed outside the rotor 20. The rotor 20 has a cylindrical rotor core 22, a plurality of magnet housings 24 that accommodate rare earth magnets 10 at predetermined intervals along the outer circumferential surface of the cylindrical rotor core 22, and the plural rare earth magnets 10 accommodated in the magnet housings 24. In the motor of the present embodiment, the rare earth magnets 10 are disposed within the individual magnet housing 24 in a plural number, where each rare earth magnet may be in contact with an adjoining rare earth magnet through the resistive layer. Thus, rare earth magnets are insulated from each other within each magnet housing 24, and the eddy current loss at the time of motor use is reduced. Further, in a motor that is employed for use as an air-conditioner, a mold resin or an adhesive does not usually intervene between the rotor core 22 (i.e., the interior wall surface of the magnet housing 24) and the rare earth magnets. Even when the rare earth magnet 10 of the present embodiment is applied to such a motor, it can reduce the eddy current loss because of being in contact with the rotor core 22 through the resistive layer 5.

The rare earth magnets 10 that are adjacent to each other along the circumferential direction of the rotor 20 are accommodated in the magnet housing 24 so that an N-pole and a S-pole are positioned opposite to each other. Thus, the rare earth magnets 10, which are adjacent to each other along the circumferential direction, generate magnetic field lines in mutually reversed directions along the radical direction of the rotor 20.

The stator 30 has a plurality of coil parts 32 that are provided at predetermined intervals along the outer circumferential surface of the rotor 20. This coil part 32 and the rare earth magnet 10 are arranged so that they face each other. The stator 30 provides the rotor 20 with a torque by an electromagnetic action, and the rotor 20 rotates in the circumferential direction.

The IPM motor 100 comprises the rare earth magnets 10 according to the aforementioned embodiment in the rotor 20. The rare earth magnet 10 has excellent magnetic properties. The IPM motor 100 of which eddy current loss is reduced can maintain a higher efficiency as well as a higher output than can the conventional ones. The IPM motor 100 can be produced by a usual method using usual motor parts, except with respect to the rare earth magnet 10.

As for the case of a permanent magnet synchronous motor, the motor of the present invention is not limited to an IPM motor but may be an SPM motor. In addition, aside from a permanent synchronous motor, it may be a linear synchronous motor, a voice coil motor, or a vibration motor.

EXAMPLES

Example 1

<Preparatory Step (Production of Magnet Body)>

Two types of raw material alloys were provided for use, where one was an alloy for a main phase that would principally form the crystal grains (main phase) of the magnet body and the other was an alloy for a grain boundary phase that would principally form the grain boundary (grain boundary phase) of the magnet body. The alloy for main phase was as follows:
Nd: 24.70 mass %;
Dy: 0.00 mass %;
Pr: 5.30 mass %;
Co: 0.30 mass %;
Al: 0.18 mass %;
Cu: 0.10 mass %;
B: 1.00 mass %; and
Fe: Balance which contained less than 0.1 mass % of unavoidable impurities therein.

The composition of the alloy for grain boundary phase was as follows:
Nd: 28.50 mass %;
Dy: 10.00 mass %;
Pr: 7.50 mass %;
Co: 3.20 mass %;
Al: 0.18 mass %;
Cu: 0.10 mass %;
B: 0.00 mass %; and
Fe: Balance which contained less than 0.1 mass % of unavoidable impurities.

After coarsely pulverizing individual raw material alloys by hydrogen pulverization respectively, the jet mil pulverization with a high pressure $N_2$ gas was performed to prepare fine powder A and fine powder B, each having an average particle size of 4 μm.

The prepared fine powder A of the alloy for main phase and the prepared fine powder B of the alloy for grain boundary phase were mixed at a mass ratio of fine powder A:fine powder B=95:5 to prepare raw powders of the magnet body. Next, these raw material powders were used and molded in a magnetic field under the conditions such that the molding pressure was 1.2 ton/cm² (about 117.7 MPa) and the magnetic alignment field was 20 kOe (about 1591 kA/m), whereby a molded body with a cuboid shape (length×width×height=50 mm×33 mm×33 mm) was obtained. The obtained molded body was sintered under the condition of 1060° C. for 4 hours, to obtain a magnet body (a sintered body) having a composition described below.
Nd: 24.50 mass %;
Dy: 0.50 mass %;
Pr: 5.30 mass %;
Co: 0.45 mass %;
Al: 0.18 mass %;
Cu: 0.10 mass %;
B: 0.95 mass %; and
Fe: Balance which contained less than 0.1 mass % of unavoidable impurities therein.

After the obtained magnet body was cut so as to provide a predetermined dimension (30 mm×5 mm×4 mm), it was immersed in a nitric acid ethanol solution (the nitric acid concentration: 3 mass %) for 3 minutes. The magnet body was then taken out from the nitric acid ethanol solution and was subjected to ultrasonic cleaning in ethanol.

Preparation of Heavy Rare Earth Compound

Next, $DyH_2$ powder was prepared according to the following procedure. A metal Dy lump was heated at 360° C. under atmospheric pressure in a hydrogen atmosphere for one hour to allow hydrogen to be occluded. The powder with hydrogen occluded was heat-treated at 600° C. under atmospheric pressure in an argon gas atmosphere for one hour to obtain a Dy hydride. The obtained Dy hydride was confirmed to be $DyH_2$ by means of X-ray diffraction.

After the obtained $DyH_2$ was pulverized to a particle size of 100 μm or less by means of a stamp mil, ethanol was blended and wet pulverization was carried out with a ball mill to obtain a slurry containing $DyH_2$ powders with average particle sizes of 3 μm. This slurry was then diluted with ethanol, and a slurry having a solid content of 40 mass % was obtained.

<Diffusion Step>

The magnet body was immersed in the slurry having a solid content of 40 mass %. The magnet body was then taken out from the slurry and was dried, whereby the $DyH_2$ powder as a heavy rare earth compound was allowed to adhere to the surface of the magnet body. The amount of adhesion of the $DyH_2$ powder was made 0.5 mass % in terms of Dy based on the magnet body.

Subsequently, heat treatment (the diffusion treatment of the heavy rare earth element) was carried out at 900° C. for 3 hours in an Ar gas atmosphere to form a covering layer on the magnet body. In doing so, the heavy rare earth element diffused on the surface part of the magnet body. Thereby, the ratio of the heavy rare earth element to the light rare earth element became higher on the surface part of the magnet body than the inside of the magnet body. The aging treatment was then carried out by heating at 540° C. for one hour under atmospheric pressure in an Ar gas atmosphere.

<Surface Treatment Step>

Next, the magnet body having the covering layer was immersed in an aqueous nitric acid solution, which had a nitric acid concentration of 3 mass %, for 2 minutes. Ultrasonic water cleaning of the magnet body was further carried out. As a result, the surface part of the covering layer was removed.

After the removal of the surface part of the covering layer, the surface roughness of the covering layer was measured using a stylus type surface roughness tester, where the arithmetic average roughness Ra was 3.2 μm and the maximum height was 20 μm.

<Oxidation Treatment Step>

Next, the magnet body was heated at 450° C. for 10 minutes in a mixed atmosphere of superheated steam and air (the oxygen concentration: 10%) (oxidation treatment). Through this oxidation treatment, there was obtained a rare earth magnet of Example 1 where a resistive layer was provided on the surface of the magnet body comprising the covering layer.

<Compositional Analysis of Resistive Layer and Magnet Body>

The obtained rare earth magnet was processed for cross-sectional observation by cutting and grinding, and the resistive layer was observed using an electric field emission type scanning electron microscope (FE-SEM). As a result, the resistive layer shows a difference with clear contrast, and it suggests that the resistive layer differs from the magnet body with respect to composition. The thickness of the resistive layer was then 4 μm.

An EDS (energy dispersive X-ray spectrometer) was used to quantify the elements contained in the resistive layer. The resistive layer contained Dy, Nd, Fe and O, and the content of Dy was higher than the content of Nd.

An electron beam probe microanalyzer (EPMA) was used to determine the composition of the resistive layer. As a result, oxygen was about 8 mass %. In addition, in the inside of the magnet body (the region that was more than 100 μm deep from the surface of the magnet body), the content of the heavy rare earth element did not vary from the content in the original magnet body (0.5 mass %).

<Electric Resistance Evaluation of Rare Earth Magnet>

Figure 4:
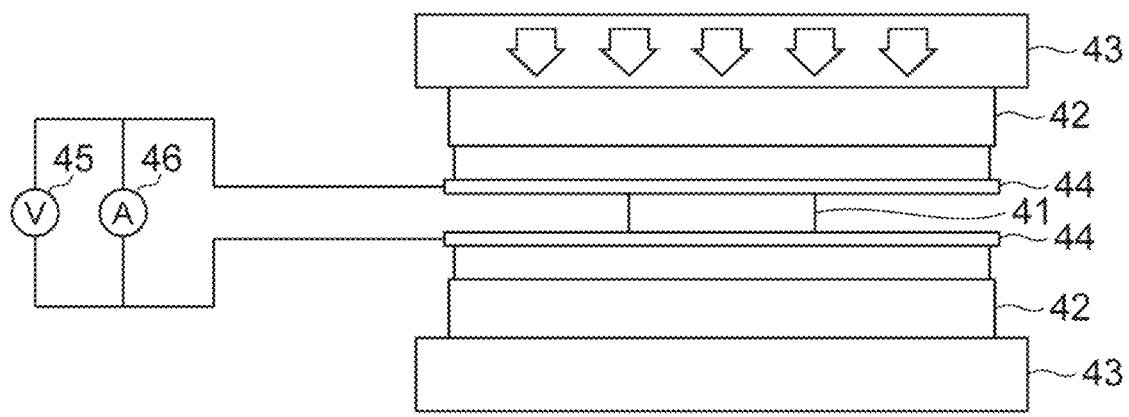
FIG. 4 is a diagram showing an example of a device for measuring an average volume resistivity according to the present invention.

The resistance value of the rare earth magnet was measured with a measuring system shown in FIG. 4. Firstly, there was provided a press where a resin plate 42 was installed on a surface plate 43 and a copper foil 44 was disposed on an iron plate on the resin plate 42. Both ends of a rare earth magnet 41 with a cuboid shape were sandwiched with the copper foils 44, and a constant load (e.g., 3 MPa) was applied. The application of the constant load was intended to stabilize the variation of resistance values by virtue of contact resistance and to improve the reproducibility. A stabilized constant current supply 46 was used to conduct a constant current I (e.g., 0.5 A) between the copper foils, and a voltage E between the copper foils was measured with a voltmeter 45. Electric resistance Rm of the rare earth magnet was determined according to the Ohm's law–electric resistance R=E/I, providing that it contained an Re portion of the contact resistance.

<Evaluation of Average Volume Resistivity of Resistive Layer>

The volume resistivity ρ of a NdFeB sintered magnet which did not form a resistive layer was assumed to be 130 μΩcm. The contact resistance was also determined to be 0.26 mΩ/cm² per contact area based on the results of the electric resistance measurement of a magnet body when the resistive layer was not formed. The average volume resistivity ρr of the resistive layer is determined according to Equation 1.

$$\rho r = (Rm - Re - \rho(T - 2Tr)/(W \times L)) \times W \times L / 2Tr \quad \text{Equation 1}$$

Here, when the magnet thickness is T, the magnet width is W, and the magnet length is L, the W×L face contacts the copper foils and the electric resistance in the I direction is measured; Rm is a measured resistance value, Rc is a contact resistance, and Tr is the thickness of the resistive layer.

The average volume resistivity of the resistive layer of Example 1 was 1,050 Ωcm.

When a SEM (scanning type electron microscope) photograph of the section of the rare earth magnet of Example 1 was also taken, it was confirmed that a multilayer structure having from the first to the third layers formed. The average thickness of each of the first to the third layers as measured from the photographed range of the SEM photograph is shown in Table 1.

<Evaluation of Eddy Current Heat Generation of Rare Earth Magnet>

Figure 5:
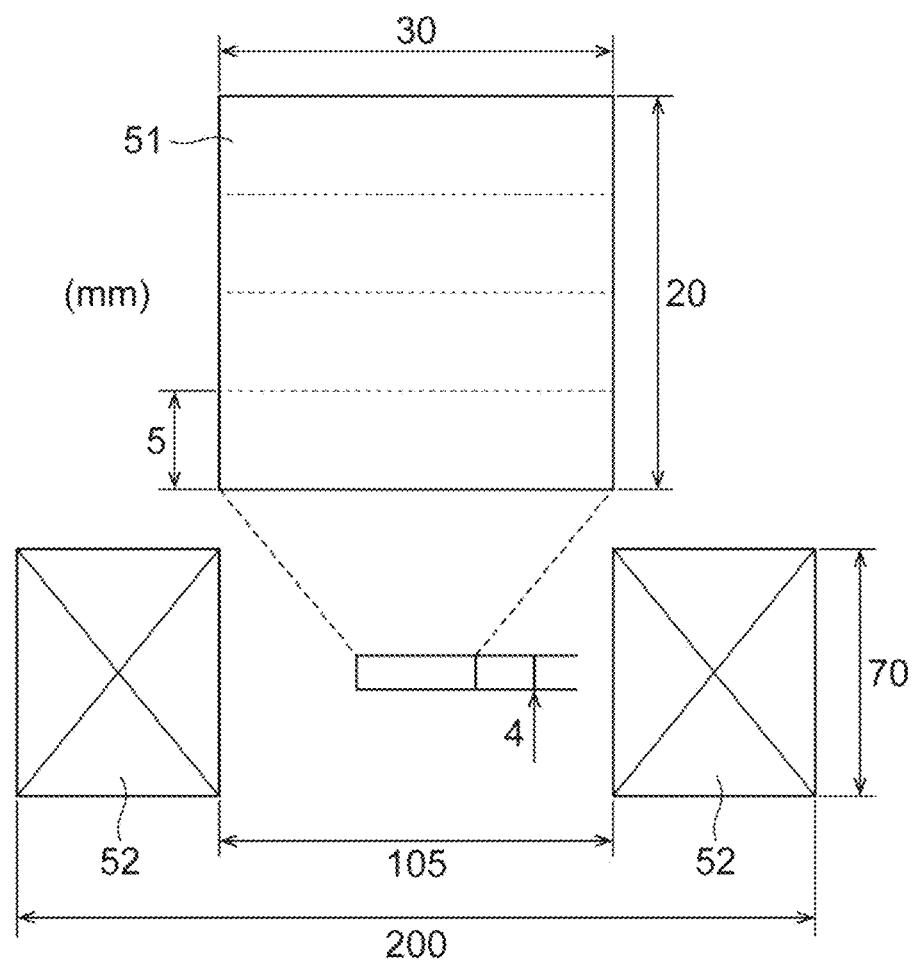
FIG. 5 is a diagram showing an example of a device for measuring an eddy current loss according to the present invention.

The evaluation of heat generation by an eddy current loss with respect the rare earth magnet of Example was carried out with a measuring system shown in FIG. 5.

(1) Sample for Measurement

Magnet shape: L=30 mm; W=5 mm; and T=4 mm. In FIG. 5, L is the longitunidial direction of the page, W is the vertical direction of the page, and T is the direction that is perpendicular to the page. Integration method: Four pieces of the rare earth magnet of Example 1 were arranged in the 5-mm direction, were caulked under the condition where load was applied, and were molded with resin. The resin-integrated magnet was magnetized in the 4-mm direction.

(2) Measurement Method (the Measurement of Eddy Current Loss)

As shown in FIG. 5, an integrated measurement sample 51 was disposed at the center of air-core inductors 52 (a coil inner diameter φ of 105, 120 turns; a winding resistance of 0.18Ω) and was covered with an insulation material (foaming silicone rubber). AC with 100 Vrms and 10 kHz (a current value of about 1.38 Arms) was applied to this inductor. K thermocouple was attached to the central position of the magnet, and the temperature rise was measured. From the slope of the temperature rise for 5 minutes, the eddy current loss was determined according to the following equation:

$$Q = m \cdot c \cdot dT/dt$$

Q: eddy current loss; m: mass; c: specific heat [0.453 kJ/(kg·K)]

dT/dt: slope of temperature rise per unit time (5 minutes in the present example)

Table 1 shows the measurement results of the eddy current heat generation (loss). In the same manner, an eddy current loss was measured for the magnet body prior to the formation of the resistive layer. It was made a reference and the ratio of the eddy current loss of Example 1 was determined. Specifically, the ratio was standardized. If the value of the standardized eddy current loss is 30% or less, it can be concluded that the eddy current loss is sufficiently reduced.

Example 2

Similarly to Example 1, a magnet body was produced, except that in the surface treatment step, after immersing a magnet body in a 3 mass % aqueous nitric acid solution for 2 minutes followed by ultrasonic water cleaning, the magnet body after washing was heat-treated at 900° C. without having a heavy rare earth compound adhered thereto. That is the diffusion of the heavy rare earth elements was not performed. The obtained magnet body was heated to 500° C. in a nitrogen atmosphere. After the temperature reached 500° C., a mixed atmosphere of nitrogen and air (the oxygen concentration: 10%) was introduced for 10 minutes (oxidation treatment). The atmosphere was then changed to a nitrogen atmosphere and the temperature was allowed to fall. Through this oxidation treatment, there was obtained the rare earth magnet of Example 2 provided with a resistive layer on the surface of the magnet body containing a covering layer.

With respect to the obtained rare earth magnet, the thickness of the resistive layer was 6.1 μm when the compositional analysis of the resistive layer and the magnet body was carried out similarly to Example 1. In addition, the resistive layer contained Dy, Nd, Fe, and O, and the oxygen content was about 8 mass %. Further, the average volume resistivity and the eddy current loss of the resistive layer were measured for the rare earth magnet of Example 2 similarly to Example 1. Still further, similarly to Example 1, an SEM photograph was taken to determine the thickness of each of the first to the third layers that compose the resistive layer. Results are shown in Table 1.

Example 3

Similarly to Example 1, a rare earth magnet of Example 3 was produced, except that the magnet body was heated at 500° C. for 10 minutes in a mixed atmosphere of superheated steam and air (the oxygen concentration: 10%). With respect to the obtained rare earth magnet, the thickness of the resistive layer was 7.5 μm when the compositional analysis of the resistive layer and the magnet body was carried out similarly to Example 1. In addition, the resistive layer contained Dy, Nd, Fe, and O, and the oxygen content was about 8 mass %. Further, the average volume resistivity and the eddy current loss of the resistive layer were measured for the rare earth magnet of Example 3 similarly to Example 1. Still further, similarly to Example 1, an SEM photograph was taken to determine the thickness of each of the first to the third layers that compose the resistive layer. Results are shown in Table 1.

Example 4

Similarly to Example 2, a rare earth magnet of Example 4 was produced, except that in the oxidation treatment step, a mixed atmosphere of nitrogen and air (the oxygen concentration: 10%) was introduced for 20 minutes after the treatment temperature reached 500° C. With respect to the obtained rare earth magnet, the thickness of the resistive layer was 11.3 μm when the compositional analysis of the resistive layer and the magnet body was carried out similarly to Example 1. In addition, the resistive layer contained Dy, Nd, Fe, and O, and the oxygen content was about 8 mass %. Further, the average volume resistivity and the eddy current loss of the resistive layer were measured for the rare earth magnet of Example 4 similarly to Example 1. Still further, similarly to Example 1, an SEM photograph was taken to determine the thickness of each of the first to the third layers that compose the resistive layer. Results are shown in Table 1.

Example 5

Figure 6:
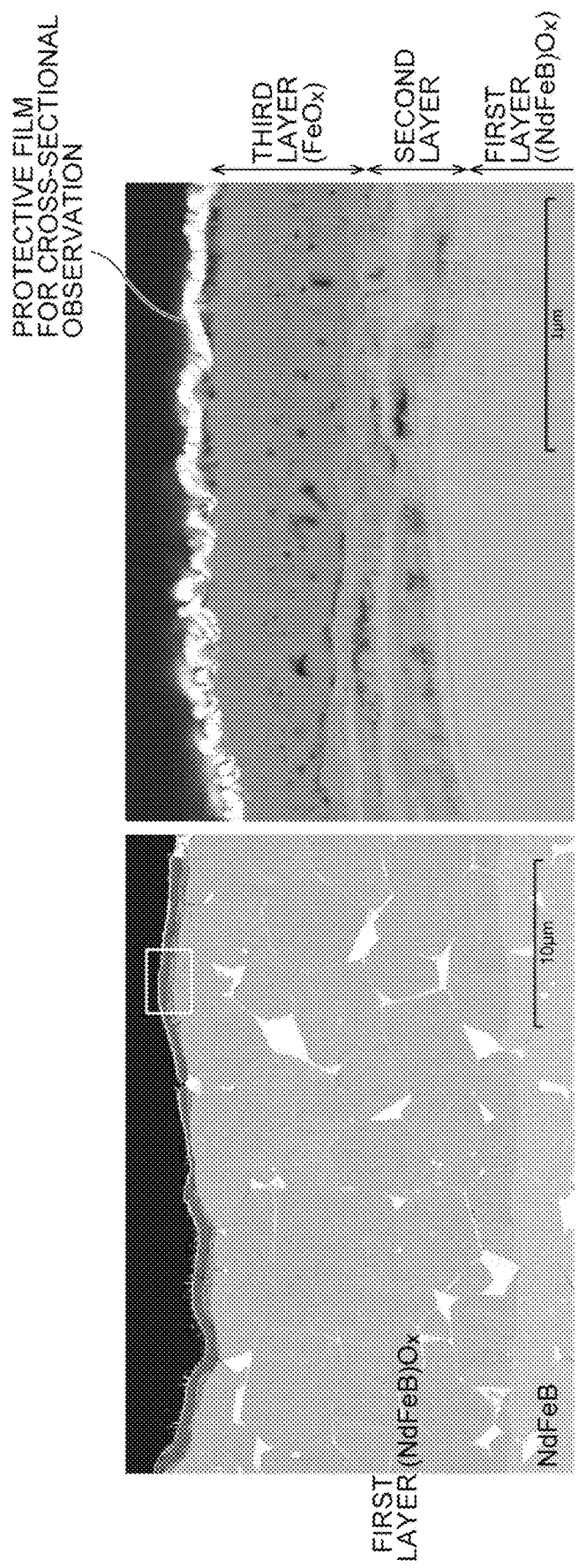
FIG. 6 is an SEM (scanning type electron microscope) photograph of a section of the rare earth magnet of Example 5.

Similarly to Example 2, a rare earth magnet of Example 5 was produced, except that the magnet body was heated at 500° C. for 20 minutes in a mixed atmosphere of superheated steam and air (the oxygen concentration: 10%). With respect to the obtained rare earth magnet, the thickness of the resistive layer was 21.9 μm when the compositional analysis of the resistive layer and the magnet body was carried out similarly to Example 1. In addition, the resistive layer contained Dy, Nd, Fe, and O, and the oxygen content was about 8 mass %. Further, the average volume resistivity and the eddy current loss of the resistive layer were measured for the rare earth magnet of Example 5 similarly to Example 1. Still further, similarly to Example 1, an SEM photograph was taken to determine the thicknesses of each of the first to the third layers that compose the resistive layer. Results are shown in Table 1. FIG. 6 shows an SEM photograph of the rare earth magnet of Example 5. The right figure of FIG. 6 magnifies a portion surrounded by the square in the left figure of FIG. 6. As shown in the right figure of FIG. 6, a clear boundary can be seen between the first layer and the second layer as well as between the second layer and the third layer because of the differences in the structures and the compositions of the respective layers. As a result of the elemental analysis by EPMA, the third layer contained iron and oxygen and the first layer contained neodymium, iron, boron, and oxygen. In the second layer, there was seen a structure where two types of thin layers, 2-A layer and 2-B layer having a more content of iron and a less content of R than the 2-A layer, were alternately laminated.

Comparative Example 1

Similarly to Example 2, a rare earth magnet of Comparative Example 1 was produced, except that in the oxidation treatment step, a mixed atmosphere of nitrogen and air (the oxygen concentration: 10%) was introduced for 5 minutes after the treatment temperature reached 450° C. With respect to the obtained rare earth magnet, the thickness of the resistive layer was 1.6 μm when the compositional analysis of the resistive layer and the magnet body was carried out similarly to Example 1. In addition, the resistive layer contained Dy, Nd, Fe, and O, and its oxygen content was about 8 mass %. Further, the average volume resistivity and the eddy current loss of the resistive layer were measured for the rare earth magnet of Comparative Example 1 similarly to Example 1. Results are shown in Table 1.

Comparative Example 2

Similarly to Example 2, a rare earth magnet of Comparative Example 2 was produced, except that in the oxidation treatment step, a mixed atmosphere of nitrogen and air (the oxygen concentration: 10%) was introduced for 120 minutes after the treatment temperature reached 500° C. With respect to the obtained rare earth magnet, the thickness of the resistive layer was 29.7 μm when the compositional analysis of the resistive layer and the magnet body was carried out similarly to Example 1. In addition, the resistive layer contained Dy, Nd, Fe, and O, and its oxygen content was about 8 mass %. However, cracks were found at the boundary between the resistive layer and the magnet body, and a part thereof was exfoliated from the boundary. Further, the average volume resistivity and the eddy current loss of the resistive layer were measured for the rare earth magnet of Comparative Example 2 similarly to Example 1. Results are shown in Table 1. The reason why its average volume resistivity is low in spite of the resistive layer being thick is thought to be due to the fact that the apparent average volume resistivity has lowered by virtue of the electrical conduction resulting from the exfoliation of the part of the resistive layer.

Comparative Example 3

Similarly to Example 2, a rare earth magnet of Comparative Example 3 was produced, except that in the oxidation treatment step, a mixed atmosphere of nitrogen and air (the oxygen concentration: 10%) was introduced for 0.5 minutes after the treatment temperature reached 500° C. With respect to the obtained rare earth magnet, the thickness of the resistive layer was 1.8 μm when the compositional analysis of the resistive layer and the magnet body was carried out similarly to Example 1. In addition, the resistive layer contained Dy, Nd, Fe, and O, and its oxygen content was about 8 mass %. Further, the average volume resistivity and the eddy current loss of the resistive layer were measured for the rare earth magnet of Comparative Example 3 similarly to Example 1. Results are shown in Table 1. Although the resistivity was relatively as high as 1,210 Ωm, the eddy current loss was as large as 40.2%. This is thought that because the thickness of the resistive layer was relatively thin, electrical leak occurred frequently between the magnets.

TABLE 1

| | Resistive Layer | | | | | Eddy Current Loss (W) | | | Acceptance |
|---|---|---|---|---|---|---|---|---|---|
| | Total Film Thickness (μm) | First Layer Film Thickness (μm) | Second Layer Film Thickness (μm) | Third layer Film Thickness (μm) | Average Volume Resistivity (Ωcm) | Temperature Rise (° C./min) | Convened Loss (W) | Standard-ization (%) | 30% or Less Acceptable |
| Reference | 0 | 0 | 0 | 0 | — | 2.54 | 0.35 | 100.0 | NG |
| Example 1 | 4.0 | 3.9 | 0.03 | 0.09 | 1050 | 0.69 | 0.09 | 27.2 | OK |
| Example 2 | 6.1 | 5.9 | 0.05 | 0.15 | 1483 | 0.68 | 0.09 | 26.8 | OK |
| Example 3 | 7.5 | 7.2 | 0.07 | 0.22 | 7650 | 0.52 | 0.07 | 20.5 | OK |
| Example 4 | 11.3 | 10.9 | 0.14 | 0.29 | 21089 | 0.41 | 0.06 | 16.1 | OK |
| Example 5 | 21.9 | 21.2 | 0.32 | 0.40 | 82935 | 0.32 | 0.04 | 12.6 | OK |
| Comparative Example 1 | 1.6 | 1.55 | 0.01 | 0.03 | 765 | 1.16 | 0.16 | 45.7 | NG |
| Comparative Example 2 | 29.7 | 28.4 | 0.4 | 0.9 | 703 | 1.20 | 0.16 | 47.2 | NG |
| Comparative Example 3 | 1.8 | 1.72 | 0.02 | 0.06 | 1210 | 1.02 | 0.14 | 40.2 | NG |

DESCRIPTION OF REFERENCE NUMERALS

1—rare earth magnet
3—magnet body
5—resistive layer
20—rotor
22—rotor core
24—magnet housing
30—stator
32—coil part
100—IPM motor

What is claimed is:

1. A rare earth magnet comprising:
a magnet body comprising a rare earth element and iron; and
a resistive layer formed on at least one surface of the magnet body,
wherein the resistive layer comprises a rare earth element, iron, and oxygen,
wherein the resistive layer has an average volume resistivity of $10^3$ Ωcm or more and a thickness of from 3 to 25 μm to reduce eddy current loss,
wherein the resistive layer does not include fluorine atoms, and
wherein the resistive layer comprises:
a first layer covering the magnet body and comprising at least, a rare earth element, iron, and oxygen;
a second layer covering the first layer and comprising at least, a rare earth element, iron, and oxygen; and
a third layer covering the second layer and comprising at least, iron and oxygen,
wherein the second layer, including a 2-A layer and a 2-B layer, has a less content of iron than each of the first and the third layers and has a structure such that 2-A layer and 2-B layer are alternately laminated, the 2-B layer having a more content of iron and a less content of R than the 2-A layer, wherein R is the rare earth element.

2. The rare earth magnet according to claim 1, wherein the magnet body comprises Nd, Pr, Dy, or Tb.

3. The rare earth magnet according to claim 1, comprising a heavy rare earth element(s) and having a region where a concentration of the at least one heavy rare earth element decreases from the at least one surface of the rare earth magnet toward an inside thereof.

4. A motor comprising a plurality of the rare earth magnets according to claim 1, wherein each of the rare earth magnets is in contact with an adjoining rare earth magnet through the resistive layer.

5. A motor comprising a plurality of the rare earth magnets according to claim 1, wherein the rare earth magnet is in contact with a rotor core through the resistive layer.

* * * * *